(12) United States Patent
Chen

(10) Patent No.: US 7,650,056 B2
(45) Date of Patent: Jan. 19, 2010

(54) METHOD FOR MANUFACTURING A LIGHT-GUIDING PLATE AND KEY MODULE HAVING THE LIGHT-GUIDING PLATE

(75) Inventor: Ko-Ju Chen, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 501 days.

(21) Appl. No.: 11/560,942

(22) Filed: Nov. 17, 2006

(65) Prior Publication Data

US 2008/0117639 A1 May 22, 2008

(51) Int. Cl.
*G02B 6/10* (2006.01)
*F21V 11/00* (2006.01)
*B29D 11/00* (2006.01)

(52) U.S. Cl. ...................................... 385/146; 362/361
(58) Field of Classification Search ................. 385/146; 362/361
See application file for complete search history.

(56) References Cited

U.S. PATENT DOCUMENTS

| 5,053,928 | A | 10/1991 | Pasco |
| 5,083,240 | A | 1/1992 | Pasco |
| 5,669,486 | A * | 9/1997 | Shima ........................ 200/314 |
| 5,746,493 | A | 5/1998 | Jonsson et al. |
| 6,422,712 | B1 | 7/2002 | Nousiainen et al. |
| 6,592,233 | B1 | 7/2003 | Parikka |
| 6,676,268 | B2 | 1/2004 | Ohkawa |
| 6,746,129 | B2 | 6/2004 | Ohkawa |
| 6,805,490 | B2 | 10/2004 | Levola |
| 6,834,973 | B2 | 12/2004 | Ohkawa |
| 6,836,303 | B2 | 12/2004 | Kim |
| 6,926,418 | B2 | 8/2005 | Ostergard et al. |
| 6,979,112 | B2 | 12/2005 | Yu et al. |
| 6,991,359 | B2 | 1/2006 | Leu et al. |
| 7,411,142 | B2 * | 8/2008 | Jung et al. .................. 200/314 |
| 7,525,454 | B2 * | 4/2009 | Jung et al. .................... 341/22 |
| 7,589,292 | B2 * | 9/2009 | Jung et al. .................. 200/512 |
| 2006/0260921 | A1 * | 11/2006 | Lee et al. .................... 200/313 |

* cited by examiner

*Primary Examiner*—Uyen-Chau N Le
*Assistant Examiner*—Daniel Petkovsek
(74) *Attorney, Agent, or Firm*—Chun-Ming Shih

(57) ABSTRACT

For manufacturing a light-guiding plate and a key module having the light-guiding plate, a mold is prepared first. Then, a material having high light transmittance is injected into the mold. After the plastic material is formed, the mold is released, so that the plastic material is formed into a sheet-like light-guiding plate, and one surface of the light-guiding plate is formed with a plurality of light-guiding portions thereon. The light-guiding plate is disposed in the key module of an electronic device. The light generated by light-emitting elements within the electronic device is introduced from the front end of a substrate of the light-guiding plate, and the light is refracted by the light-guiding portion to a corresponding key, thereby to display the numeral or pattern of the surface of a key cap of the key.

19 Claims, 6 Drawing Sheets

METHOD FOR MANUFACTURING A LIGHT-GUIDING PLATE AND KEY MODULE HAVING THE LIGHT-GUIDING PLATE

BACKGROUND OF THE INVENTION

1. Field of the Invention

The present invention relates to a light-guiding plate, and in particular to a method for manufacturing a light-guiding plate having a light-condensing effect by changing the traveling path of the light.

2. Description of Prior Art

With the progress and development of technology, portable electronic products such as mobile phone, personal digital assistant have become necessary information products for modern people. These electronic products are each provided with a key structure by which a user can input information or perform individual functions of the electronic product.

In order to allow the user to see the position and function of the key without the illumination of a light source, the key structure of the electronic product is provided with a back light source. The light generated by the back light source can allow the user to clearly see the position of each key and the pattern and numeral on the surface of the key without the illumination of the light source.

The back light source within the general key structure is a light-guiding plate. After the light-emitting element within the electronic product is lighted up, the light is introduced via the front end of the light-guiding plate and is projected onto the bottom of each key via the light-guiding plate, thereby to display the numeral and pattern of the surface of the key. In this way, the user may not erroneously press the wrong key even without the illumination of a light source. Since the light is introduced into the rear end of the light-guiding plate from the front end thereof, the intensity of the light will be gradually reduced, so that the brightness of the numeral and pattern displayed on the surface of the corresponding key on the rear end of the light-guiding plate is insufficient. Therefore, in order to make the light source on the light-guiding plate more uniform, a plurality of light-emitting elements and a light-refracting plate are additionally provided in the periphery of the light-guiding plate, thereby to uniform the light source on the light-guiding plate. This will cause the increase in the amount of electricity consumed by the electronic products and the cost accordingly.

SUMMARY OF THE INVENTION

In view of the differentias of the prior art, the present invention provides a light-guiding plate having a light-condensing effect. Thereby, the number of the light-emitting elements and the usage of the light-refracting plate and then the amount of electricity consumption and cost can be reduced.

The method for manufacturing a light-guiding plate of the present invention comprises the steps of: preparing a mold having a cavity therein for forming the light-guiding plate; injecting a material having a high light transmittance into the cavity of the mold; releasing the mold to form the plastic material into a sheet-like light-guiding plate, and forming a plurality of light-guiding portions on one surface of the light-guiding plate, wherein after the light-guiding plate is disposed on a key model, the external light is introduced via the front end of a substrate of the light-guiding plate, the light is refracted by the light-guiding portion onto a corresponding key, thereby to display the numeral or pattern of the surface of the key cap of the key.

DETAILED DESCRIPTION OF THE INVENTION

The technical contents and the detailed description of the present invention will be made with reference to the accompanying drawings.

Figure 1:
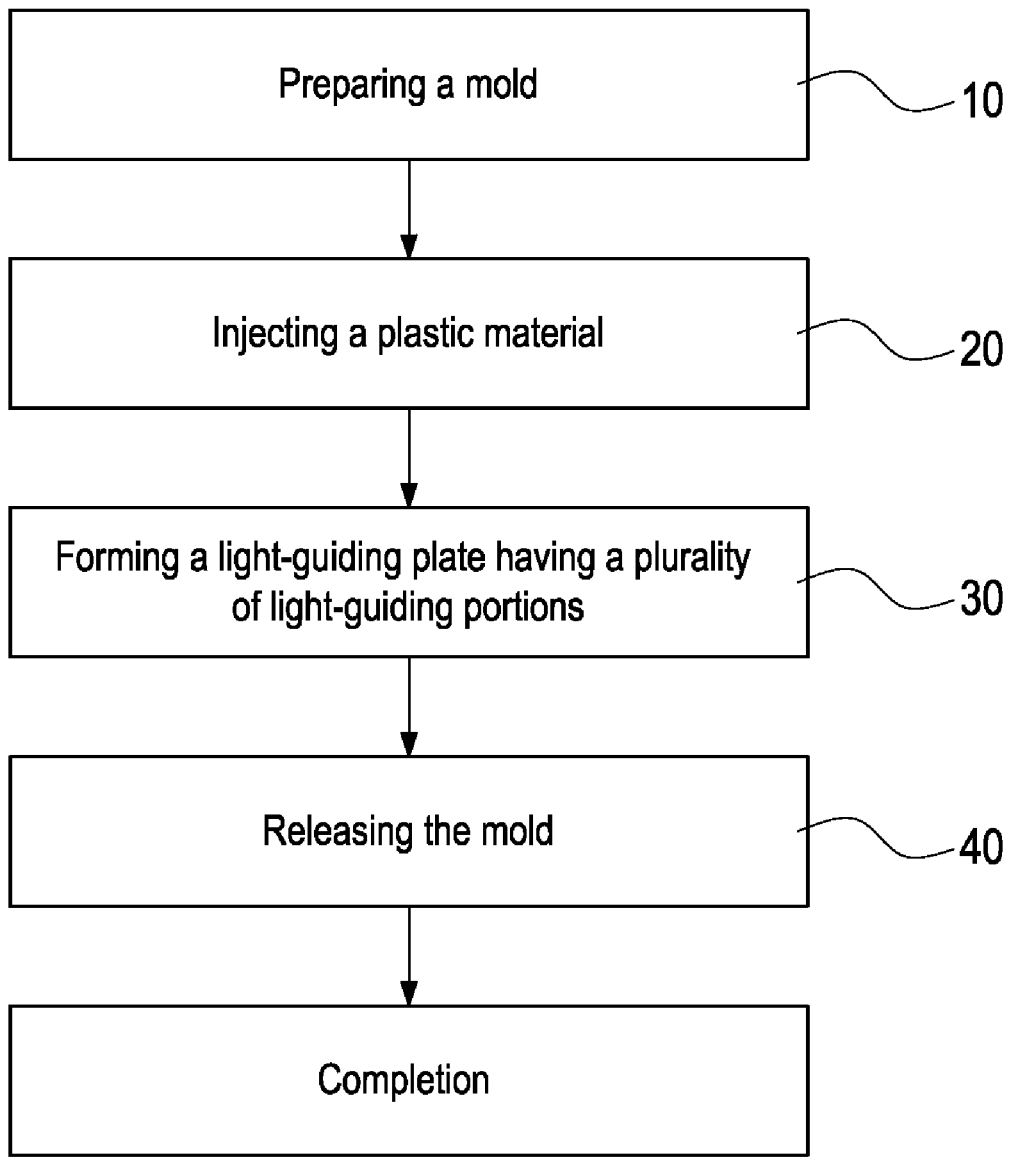
FIG. 1 is a flow chart showing the process of manufacturing the light-guiding plate of the present invention.

With reference to FIG. 1, it is a flow chart of the process of manufacturing the light-guiding plate of the present invention. As shown in the drawing, the method for manufacturing a light-guiding plate of the present invention comprises the following steps. First, in a step 10, a mold is prepared. The mold is provided with a cavity therein for forming the light-guiding plate.

After the step 10 is completed, the process goes into a step 20, in which a plastic material having high light transmittance, such as any of TPU, PC, SILICONE, PMMA or PET, is injected into the cavity of the mold.

In the step 20, the plastic material having high light transmittance is injected into the mold.

In a step 30, after the plastic material is injected into the mold, it is formed into the light-guiding plate having a plurality of light-guiding portions.

In a step 40, the mold is released, so that the thus-formed light-guiding plate is released from the mold to finish the manufacturing of the light-guiding plate.

The above light-guiding portion is made by means of injection molding. Additionally, the light-guiding plate can be formed with pits recessed into the light-guiding plate by laser, etching, electric discharge machining or hot pressing with needles.

Figure 2:
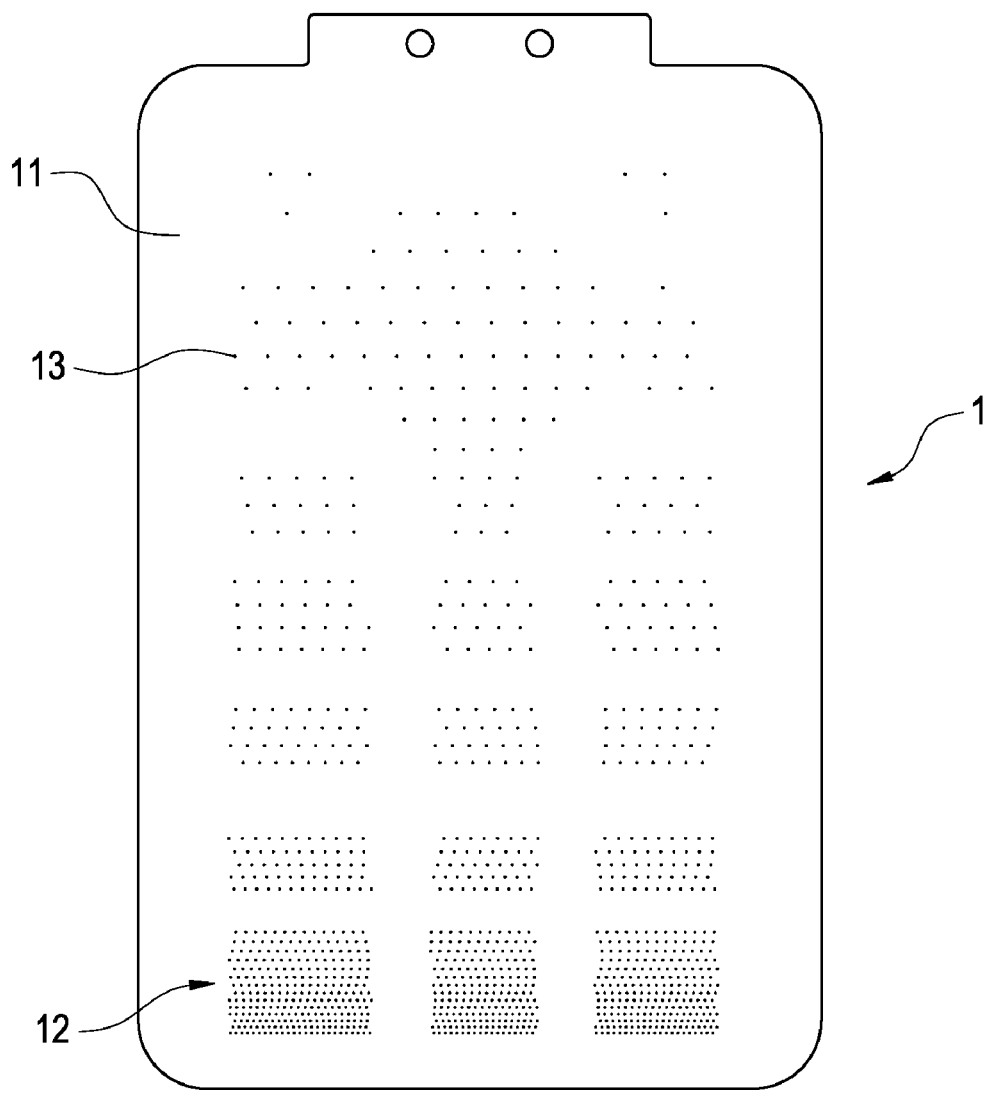
FIG. 2 is a schematic view of the light-guiding plate of the present invention.

With reference to FIG. 2, it is a schematic view showing the light-guiding plate of the present invention. The light-guiding plate 1 manufactured according to the process of FIG. 1 has a sheet-like substrate 11. One surface of the substrate 11 has a plurality of blocks 12 corresponding to the positions of each key (not shown). Each block 12 has at least one light-guiding portion 13 thereon. The diameter of each light-guiding portion 13 is in the range of 0.01 to 0.1 mm.

Further, the distribution density of the light-guiding portion 13 on each block 12 is in the range of 1 dot/mm$^2$ to 20 dot/mm$^2$. Accordingly, the closer the distance from the light source is, the thinner the distribution density of the light-guiding portion in the block 12 of the light-guiding plate 1 is.

On the contrary, the farther the distance from the light source is, the denser the distribution density of the light-guiding portion 13 is.

Figure 3:
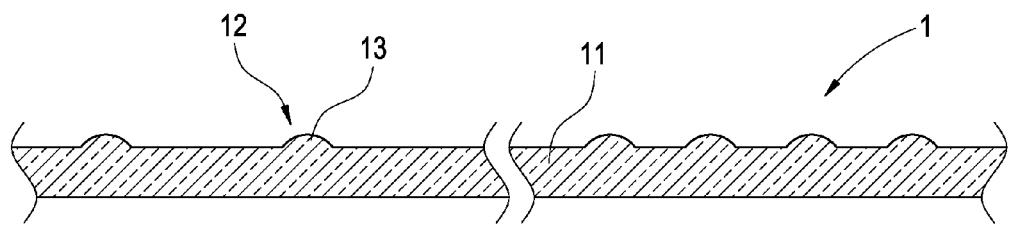
FIG. 3 is a partially enlarged side view of the light-guiding plate of the present invention.
Figure 4:
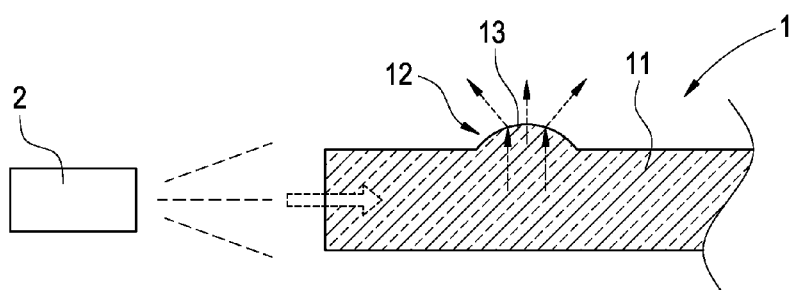
FIG. 4 is a schematic view of a single light-guiding portion of the present invention.

With reference to FIGS. 3 and 4, they are a partially enlarged side view of the light-guiding plate and a schematic view of a single light-guiding portion of the present invention, respectively. As shown in the drawings, the light-guiding portion 13 on the light-guiding plate 1 is formed into a bump protruding from the surface of the substrate 11. When the light generated by the light-emitting elements 2 on the front end of the light-guiding plate 1 is introduced into the distal end of the substrate 11 from the front end thereof, the light is refracted by the light-guiding portion 13 to the corresponding key (not shown), thereby to display the numeral or pattern of the surface of the key cap even without the light source. In the drawings, the light-emitting element is a light-emitting diode.

Since the light is introduced into the distal end of the substrate 11 from the front end thereof, the intensity of the light is gradually reduced. Accordingly, the intensity of the light projected on the substrate 11 closer to the light source is much larger, and the distribution density of the light-guiding portion 13 in the block 12 is thinner. On the contrary, the distribution density of the light-guiding portion 13 in the blocks farther from the light source is denser. Therefore, after the reduced light is condensed, the condensed light is refracted via the light-guiding portion 13 to the corresponding key (not shown), so that the distribution of the light source can be uniformed. In the drawings, the light-guiding portion 13 is formed into a bump. Also, it can be formed into any one of a cone or pyramid.

Figure 5:
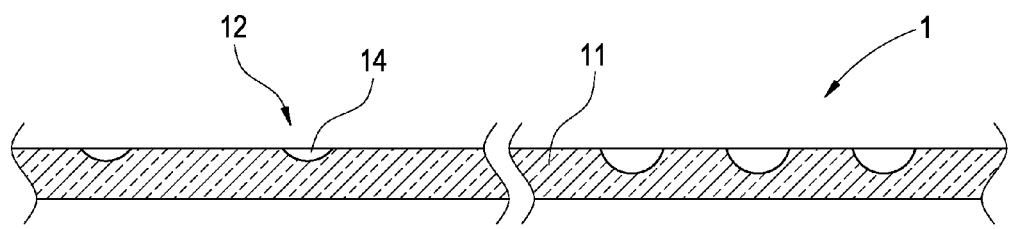
FIG. 5 is a schematic view of the light-guiding plate of another embodiment of the present invention.
Figure 6:
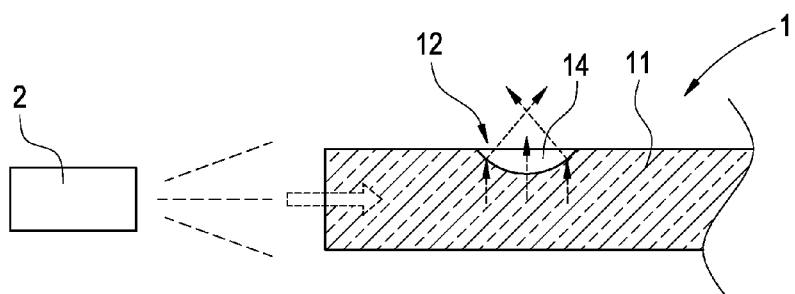
FIG. 6 is a schematic view of a single light-guiding portion of the present invention.

FIG. 5 is a schematic view of the light-guiding plate of another embodiment of the present invention, and FIG. 6 is a schematic view of a single light-guiding portion of the present invention. As shown in the drawings, the light-guiding portion of the light-guiding plate 1 is a pit 14 recessed in the substrate 11. The depth of each pit 14 is in the range of 0.01 mm to 0.1 mm. The radius of the pit 14 is in the range of the 0.01 mm to 0.03 mm.

Therefore, the closer the distance from the light source is, the smaller the depth of the pit 14 on the substrate 11 is and the opening thereof is also smaller. On the contrary, the farther the distance from the light source is, the larger the depth of the pet is and the opening thereof is larger.

Similarly, after the light generated by the light-emitting element 2 is introduced from the front end of the substrate 11, the light is refracted onto the corresponding key (not shown) via the pit 14, thereby to display the numeral or pattern of the surface of the key cap.

Figure 7:
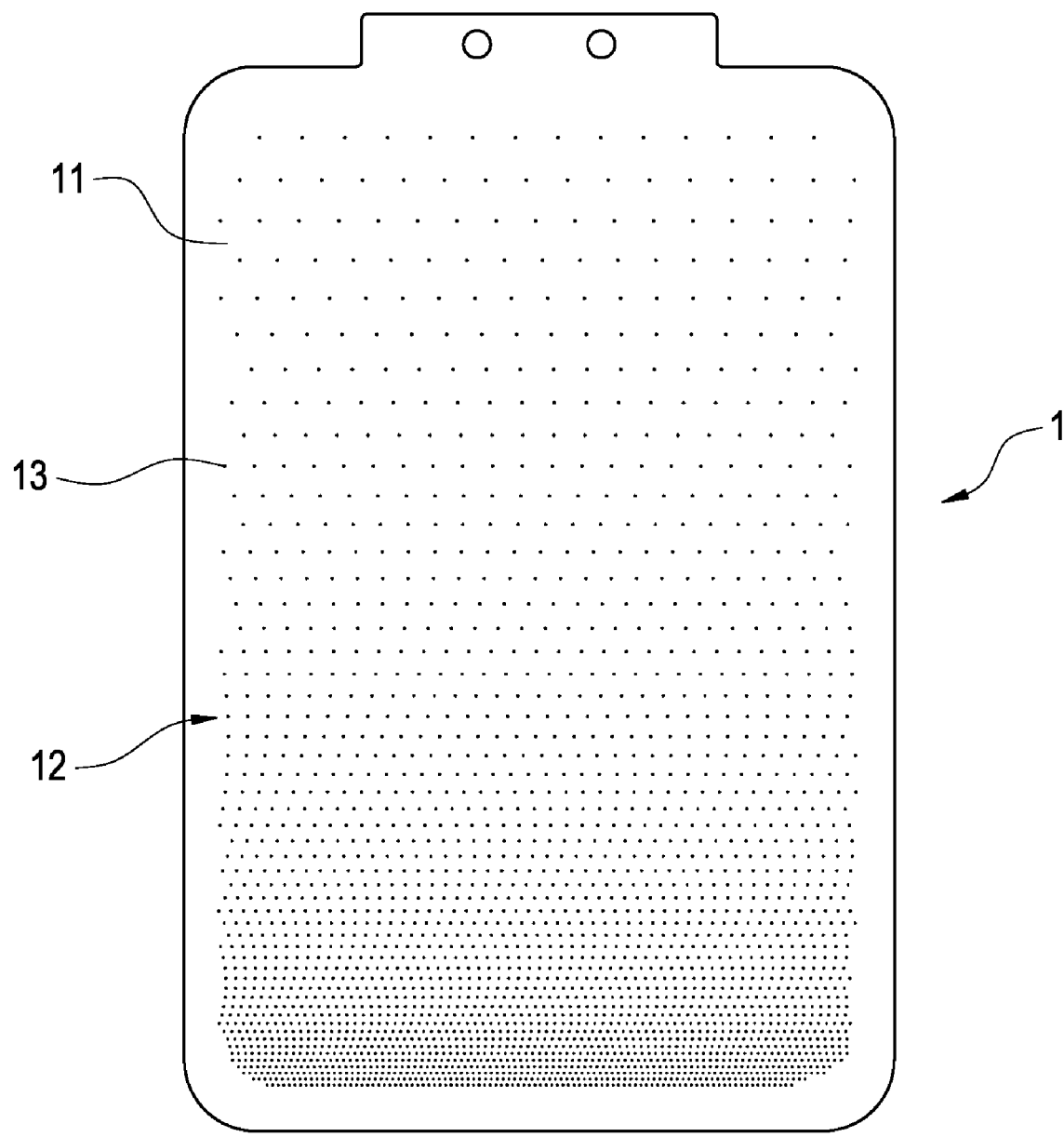
FIG. 7 is a schematic view of the light-guiding plate of still another embodiment of the present invention.

With reference to FIG. 7, it is a schematic view showing the light-guiding plate of another embodiment of the present invention. As shown in the drawing, the light-guiding plate 1 has a substrate 11 thereon. The substrate 11 has a plurality of light-guiding portions 13. The distribution density of the light-guiding portions 13 is gradually denser. Specifically, with respect to the light source, the closer the distance from the light source is, the thinner the distribution density of the light-guiding portion is. On the contrary, the farther the distance from the light source is, the denser the distribution density of the light-guiding portion 13 is. Therefore, after the light is introduced from the front end of the substrate 11, the light is refracted via the light-guiding portion 13 onto the corresponding key (not shown), thereby to display the numeral or pattern of the surface of the key cap of the key.

Figure 8:
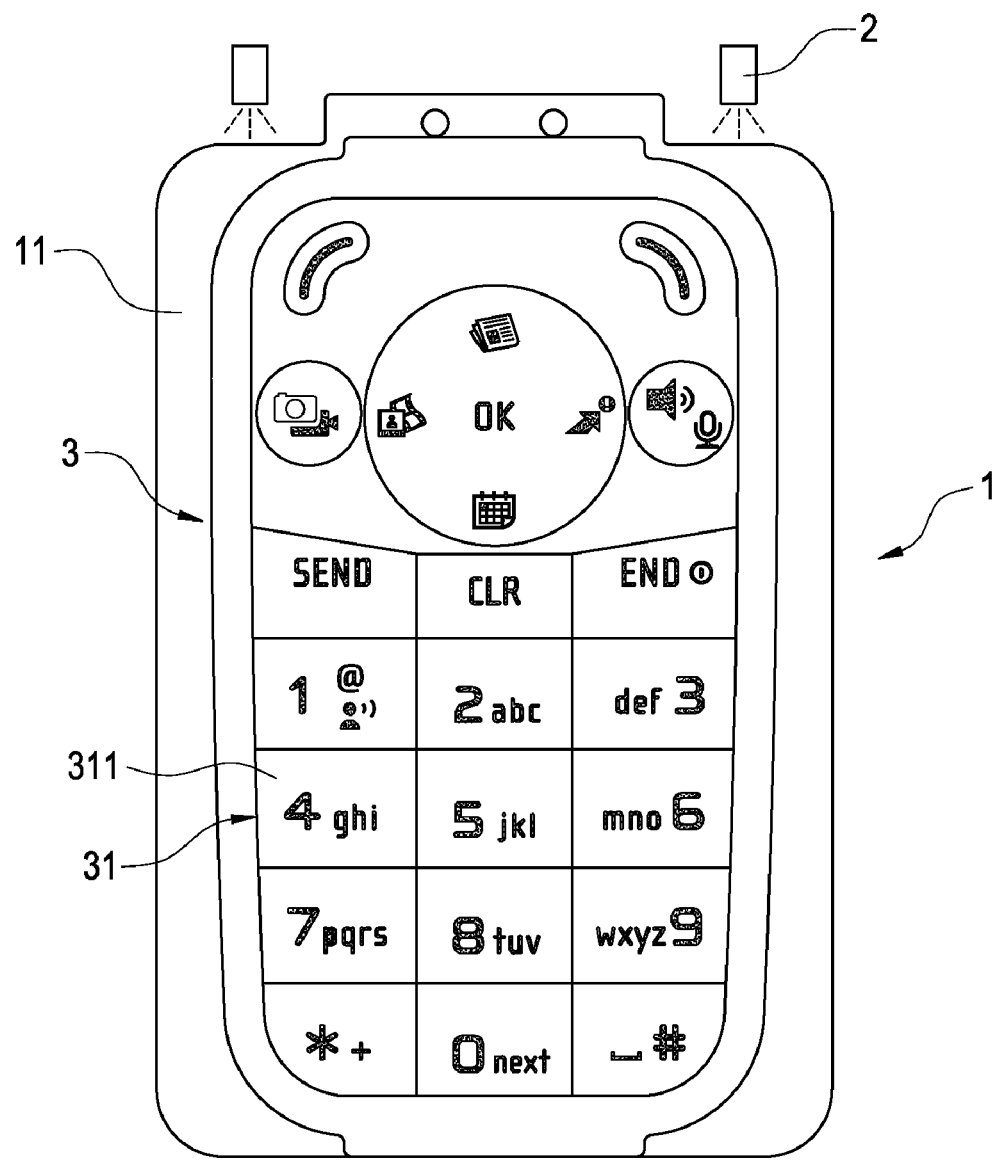
FIG. 8 is a schematic view showing the operating state of the present invention.

With reference to FIG. 8, it is a schematic view showing the operating state of the present invention. As shown in this figure, the light-guiding plate 1 shown in FIGS. 2 to 7 can be stacked with a key structure 3. After the light generated by the light-emitting element 2 of the electronic device (not shown) is introduced from the front end of the substrate 11, the light is refracted via the light-guiding portion 13 (or 14) onto the corresponding key 31, thereby to display the numeral or pattern of the surface of the key cap 311 of the key 31.

Figure 9:
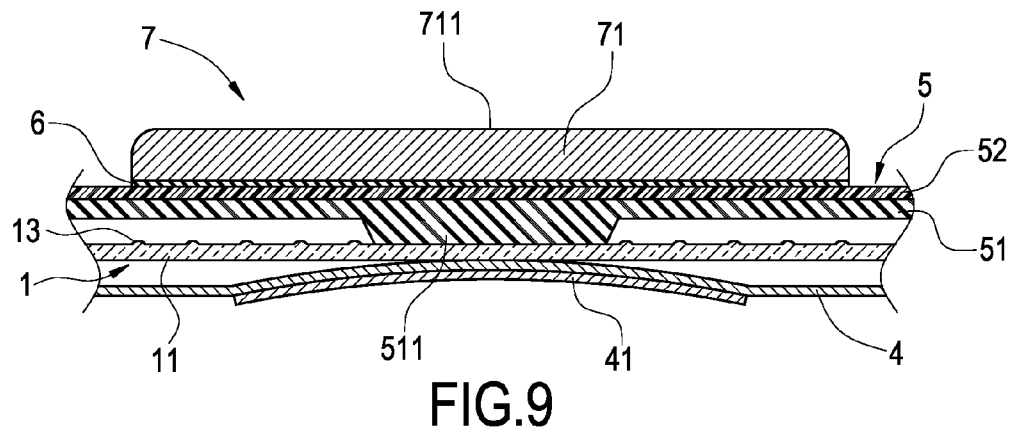
FIG. 9 is a cross-sectional view of a first derivative aspect of the present invention.

With reference to FIG. 9, it is a cross-sectional view of a first derivative aspect of the present invention. As shown in the drawing, the key structure shown in the drawing comprises a first elastic layer 4, a light-guiding plate 1, a second elastic layer 5, an adhesive layer 6, and a key group 7.

The first elastic layer 4 has a plurality of metallic pieces 41 thereon. After the key 71 is pressed, the metallic piece 41 is electrically connected with the circuit board of an electric product (not shown). At this time, the metallic piece 41 generates a crack sound, so that the user can feel the key is pressed.

The light-guiding plate 1 is disposed on the first elastic layer 4 and has a substrate 11 thereon. The substrate 11 has a plurality of light-guiding portions 13 thereon. The light-guiding portion 13 can be distributed in a scattered way or formed into a block. The shape of the light-guiding portion 13 can be any one of bump, cone and pyramid protruding from the surface of the substrate 11 (or pit recessed in the substrate).

The second elastic layer 5 is disposed on the light-guiding plate 1 and is constituted of a rubber body 51 and a hard plastic film 52 disposed on the surface of the rubber body 51. The bottom of the rubber body 51 has a protruding body 511 to correspond to the metallic piece 41.

The adhesive layer 6 is disposed on the second elastic layer 5.

The key group 7 is disposed on the adhesive layer 6 and constituted of a plurality of keys 71. Each key 71 corresponds to a protruding body 511.

When the light is introduced from the front end of the substrate 11 of the light-guiding plate 1, the light is refracted by the light-guiding portion 13 and passes through the second elastic layer 5 and the adhesive layer 6 to the corresponding key 71, thereby to display the numeral and pattern of the surface of the key cap 711 of the key 71.

At the same time, after the key 71 is pressed with an external force, the protruding body 511 of the rubber body 51 is pressed on the light-guiding plate 1 and the surface of the first elastic layer 4. In this way, the metallic piece 41 is electrically connected with the circuit board of the electronic device (not shown). Also, the metallic piece 41 generates a crack sound, so that the user can feel the key is pressed.

Figure 10:
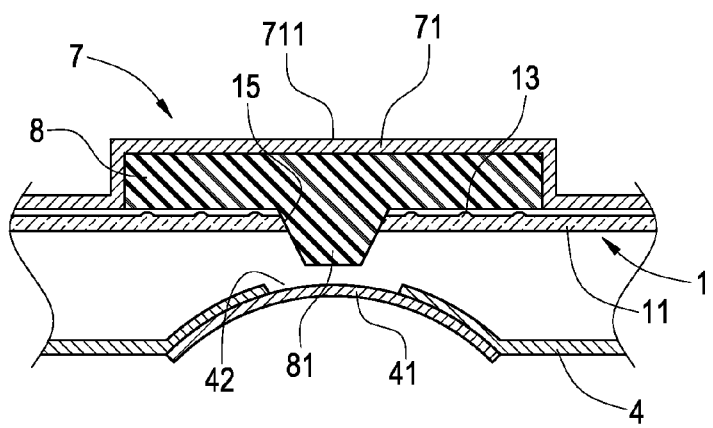
FIG. 10 is a cross-sectional view of a second derivative aspect of the present invention.

With reference to FIG. 10, it is a cross-sectional view of a second derivative aspect of the present invention. As shown in the drawing, the key structure comprises a first elastic layer 4, a light-guiding plate 1, and a key group 7.

The first elastic layer 4 has a plurality of holes 42 thereon. The other surface of the hole 42 is provided with a metallic piece 41. After the key 71 is pressed with an external force, the metallic piece 41 is electrically connected with the circuit board of the electric product (not shown). At this time, the metallic piece 41 generates a crack sound, so that the user can feel the key is pressed.

The light-guiding plate 1 is disposed on the first elastic layer 4 and has a substrate 11 thereon. The substrate 11 has a plurality of light-guiding portions 13 thereon. The light-guiding portion 13 can be distributed in a scattered way or formed into a block. The shape of the light-guiding portion 13 can be any one of bump, cone and pyramid protruding from the surface of the substrate 11 (or pit recessed in the substrate). Further, the light-guiding plate 1 has a plurality of through holes 15 thereon.

The key group 7 is disposed on the light-guiding plate 1 and constituted of a plurality of keys 71. Each key 71 is provided therein with a second elastic layer 8 made of a transparent rubber material. The bottom of the second elastic layer 8 has a protruding body 81 to correspond to the through hole 16 penetrating through the light-guiding plate 1.

When the light is introduced from the front end of the substrate 11 of the light-guiding plate 1, the light is refracted by the light-guiding portion 13 and passes through the second elastic layer 8 to the corresponding key 71, thereby to display the numeral and pattern of the surface of the key cap 711 of the key 71.

After the key 71 is pressed with an external force, the protruding body 81 of the second elastic layer 8 penetrates through the through hole 15 of the light-guiding plate 1 and the hole 42 of the first elastic layer 4, and is pressed on the surface of the metallic piece 41. In this way, the metallic piece 41 is electrically connected with the circuit board of the electronic device (not shown). Also, the metallic piece 41 generates a crack sound, so that the user can feel the key is pressed.

Figure 11:
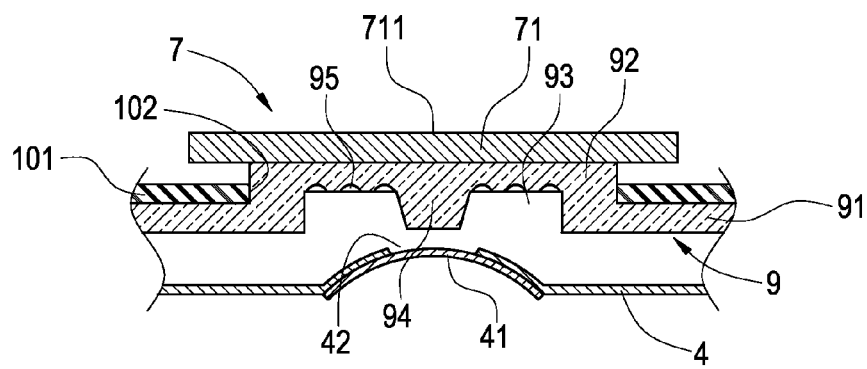
FIG. 11 is a cross-sectional view of a third derivative aspect of the present invention.

With reference to FIG. 11, it is a cross-sectional view of a third derivative aspect of the present invention. As shown in the drawing, the key structure comprises a first elastic layer 4, a light-guiding plate 9, a metallic layer 101, and a key group 7.

The first elastic layer 4 has a plurality of holes 42 thereon. The hole 42 is provided with a metallic piece 41 therein. After the key 71 is pressed, the metallic piece 41 is electrically connected with the circuit board of an electric product (not shown). At this time, the metallic piece 41 generates a crack sound, so that the user can feel the key is pressed.

The light-guiding plate 9 is disposed on the first elastic layer 4. The light-guiding plate 9 is made of a transparent rubber material and has a substrate 91 thereon. The substrate 91 has an elastic body 92 thereon. The interior of the elastic body 92 is provided with a trough 93. The bottom of the trough 93 is provided with a protruding body 94. A plurality of light-guiding portions 95 recessed in the substrate 91 is provided on the bottom of the trough 93 and between the protruding bodies 94.

The metallic layer 101 is disposed on the light-guiding plate 9. The metallic layer 101 has a through hole 102 thereon for exposing the elastic body 92.

The key group 7 is constituted of a plurality of keys 71. Each key 71 is disposed on the elastic body 92.

When the light is introduced from the front end of the substrate 91, the light is refracted by the light-guiding portion 95 and passes through the elastic body 92 to the corresponding key 71, thereby to display the numeral or pattern of the surface of the key cap 711 of the key 71.

After the key 71 is pressed with an external force, the protruding body 94 of the light-guiding plate 9 penetrates through the hole 42 of the first elastic layer 4 and is pressed on the surface of the metallic piece 41. In this way, the metallic piece 41 is electrically connected with the circuit board of the electronic device (not shown). Also, the metallic piece 41 generates a crack sound, so that the user can feel the key is pressed.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A key module having a light-guiding plate, comprising:
   a first elastic layer having a plurality of metallic pieces;
   a light-guiding plate disposed on the first elastic layer and having a substrate thereon, the substrate having a plurality of light-guiding portions thereon;
   a second elastic layer disposed on the light-guiding plate; and
   a key group disposed on an adhesive layer and constituted of a plurality of keys, each key corresponding to a protruding body.

2. The key module having a light-guiding plate according to claim 1, wherein the shape of each light-guiding portion is any one of a bump, cone or pyramid protruding from the surface of the substrate.

3. The key module having a light-guiding plate according to claim 1, wherein the light-guiding portions are distributed in a scattered manner or in blocks.

4. The key module having a light-guiding plate according to claim 1, wherein the density of the light-guiding portions in the block is in the range of 1 dot/mm$^2$ to 20 dot/mm$^2$, and the diameter of each light-guiding portion is in the range of 0.01 to 0.1 mm.

5. The key module having a light-guiding plate according to claim 1, wherein the light-guiding portions are formed into a pit recessed into the substrate, the closer the distance from the light source is, the smaller the depth of the pit is and its opening is also small, whereas the farther the distance from the light source is, the larger the depth of the pit is and its opening is large, the depth of the pit is in the range of 0.01 mm to 0.1 mm, and the radius of the opening of the pit is in the range of 0.01 mm to 0.03 mm.

6. The key module having a light-guiding plate according to claim 1, wherein the second elastic layer is constituted of a rubber body and a hard plastic film disposed on the surface of the rubber body, the bottom of the rubber body has a protruding body to correspond to the metallic piece.

7. The key module having a light-guiding plate according to claim 1, wherein the adhesive layer is disposed between the second elastic layer and the key group.

8. A key module having a light-guiding plate, comprising:
   a first elastic layer having a plurality of holes thereon, each hole provided with a metallic piece therein;
   a light-guiding plate disposed on the first elastic layer and having a substrate thereon, the substrate having a plurality of light-guiding portions thereon, the light-guiding plate having a through hole thereon; and
   a key group disposed on the light-guiding plate and constituted of a plurality of keys, each key provided with a second elastic layer therein, the bottom of the second elastic layer having a protruding body to correspond to the through hole of the light-guiding plate.

9. The key module having a light-guiding plate according to claim 8, wherein the shape of each light-guiding portion is any one of a bump, cone or pyramid protruding from the surface of the substrate.

10. The key module having a light-guiding plate according to claim 8, wherein the light-guiding portions are distributed in a scattered manner or in blocks.

11. The key module having a light-guiding plate according to claim 10, wherein the diameter of each light-guiding portion is in the range of 0.01 to 0.1 mm, and the distribution density of the light-guiding portions is in the range of 1 dot/mm$^2$ to 20 dot/mm$^2$.

12. The key module having a light-guiding plate according to claim 8, wherein the light-guiding portions are formed into a pit recessed into the substrate.

13. The key module having a light-guiding plate according to claim 12, wherein the closer the distance from the light source is, the smaller the depth of the pit is and its opening is also small, whereas the farther the distance from the light source is, the larger the depth of the pit is and its opening is large, the depth of the pit is in the range of 0.01 mm to 0.1 mm, and the radius of the opening of the pit is in the range of 0.01 mm to 0.03 mm.

14. The key module having a light-guiding plate according to claim 8, wherein the second elastic layer is made of a transparent rubber material.

15. A key module having a light-guiding plate, comprising:
- a first elastic layer having a plurality of holes thereon, each hole provided with a metallic piece therein;
- a light-guiding plate disposed on the first elastic layer and having a substrate thereon, the substrate having an elastic body thereon, the elastic body provided with a trough therein, the bottom of the trough provided with a protruding body, a plurality of light-guiding portions provided in the bottom of the trough and between the protruding body;
- a metallic layer disposed on the light-guiding plate, the metallic layer having a through hole thereon; and
- a key group constituted of a plurality of keys, the keys disposed on the elastic body.

16. The key module having a light-guiding plate according to claim 15, wherein the light-guiding plate is made of a transparent rubber material.

17. The key module having a light-guiding plate according to claim 15, wherein the closer the distance from the light source is, the smaller the depth of the pit is and its opening is also small, whereas the farther the distance from the light source is, the larger the depth of the pit is and its opening is large, the depth of the pit is in the range of 0.01 mm to 0.1 mm, and the radius of the opening of the pit is in the range of 0.01 mm to 0.03 mm.

18. The key module having a light-guiding plate according to claim 15, wherein each light-guiding portion is formed into any one of a bump, cone or pyramid protruding from the surface of the substrate.

19. The key module having a light-guiding plate according to claim 18, wherein the diameter of each light-guiding portion is in the range of 0.01 to 0.1 mm, and the distribution density of the light-guiding portions in the block is in the range of 1 dot/mm$^2$ to 20 dot/mm$^2$.

* * * * *